Nov. 27, 1934.　　　P. E. MIQUELON　　　1,982,445
BOOT
Filed Jan. 8, 1932
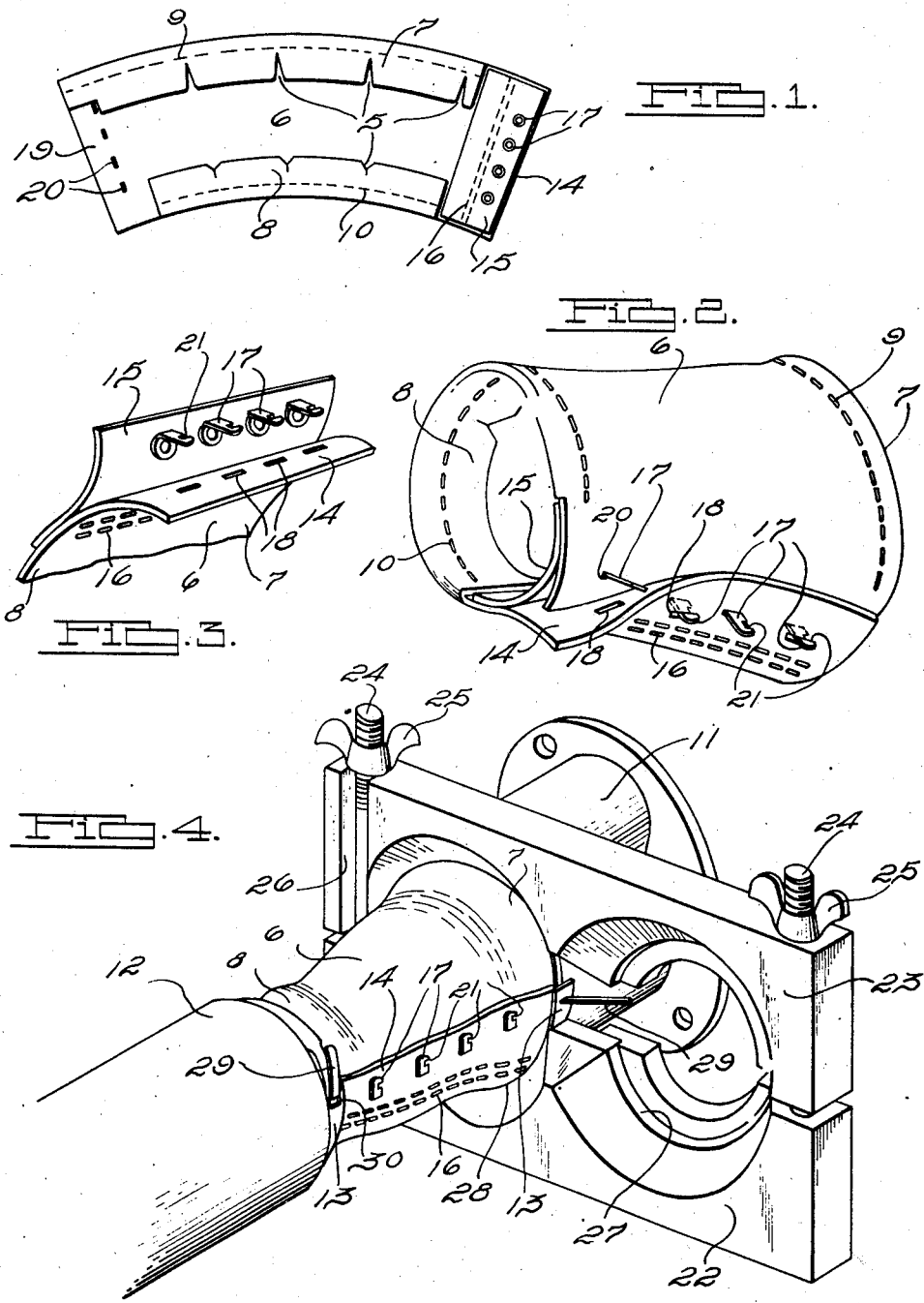
INVENTOR
Pantaleon E. Miquelon
BY
ATTORNEYS Patented Nov. 27, 1934

1,982,445

UNITED STATES PATENT OFFICE 1,982,445

BOOT

Pantaleon E. Miquelon, Dearborn, Mich., assignor to Universal Products Co., a corporation of Delaware Application January 8, 1932, Serial No. 585,532

4 Claims. (Cl. 64—89)

My invention relates to improvements in boots used as a covering at the point of joinder of the propeller shaft housing and universal joint housing in automotive vehicles. These boots are for the purpose of retaining a lubricant such as grease which is packed about the parts at the point where the propeller shaft is joined to the universal joint and must be of a flexible character and are generally made of leather such as elk skin or the like, and act in addition to retaining the lubricant, as a seal against dirt, dust and other destructive elements.

The boots deteriorate and wear out rapidly in use due to the action of grease and constant flexing and require replacement many times during the life of the automotive vehicle.

The present known types of boots are awkward to assemble and fasten in place on the propeller shaft and universal joint housings and due to their construction, add greatly to the time required to effect a replacement, which consequently adds to the cost of the service.

The principal object of my invention is to provide a replacement boot of the character described, which will be strong and durable and be suitably reinforced at the points of maximum strain and wear, which are also economical and inexpensive to manufacture and which may be easily and quickly mounted and fastened in position for use and readily removed when replacement is necessary.

The boot of my invention further provides a seal against leakage of lubricant and ingress of dirt, dust or other objectionable foreign elements.

Other objects and advantages of my invention will become apparent through a reading of the following detailed description and accompanying drawing, in which Figure 1 is a plan view of the inner side of the improved boot of my invention.

Figure 2 is an enlarged persepective view of my improved boot as it appears when partially in assembled position illustrating the manner of overlapping the ends as they are joined together.

Figure 3 is an enlarged fragmentary detail view illustrating the reinforcement flap bearing the fastening devices, and Figure 4 is an enlarged perspective view of the means employed to assemble the boot of my invention about the propeller shaft housing and universal joint housing.

Referring now to the drawing in detail, in which like numerals designate like parts throughout the several views, I have illustrated in Figure 1, a view of the inner side of the boot 6, which is of elk skin or any other leather or suitable material, this view best illustrating the manner in which the boot is made and reinforced. The side edges 7 and 8 respectively, of the boot are folded over to form reinforcing flaps which are stitched in folded position at 9 and 10 respectively, a spaced distance from each side edge, thus forming an edge of double strength. The inturned flaps 7 and 8 extend inwardly a considerable space from the side edges to prevent tearing of the stitched seams and to insure their lying in flattened position entirely under the point at which the attaching band clamps are to be applied. It will be noted that the boot is arcuately shaped so that the upper side edge 7 will be longer and have a larger diameter when the boot is wrapped and assembled in position, than the lower side edge 8. The longer end which is bounded by the reinforced edge 7 of the boot, is adapted to surround and closely fit the universal joint housing 11 of the automotive vehicle which is generally larger than the end of the propeller shaft housing 12 around which the lower reinforced edge 8 of the boot is adapted to closely fit.

Suitable notches 5 are cut in the flaps 7 and 8 at their inner edges to facilitate rolling of the boot as it is wrapped about the parts to be covered.

The reinforced edges 7 and 8 are tightly clamped to the universal joint housing 11 and propeller shaft housing 12 respectively, by metal band clamps 13 which are wrapped around the ends of the boot as will hereinafter be described. The reinforcement flaps at the edges 7 and 8 serve to strengthen the boot at this point and prevent undue wear and damage at the points of clamping.

The ends of the improved boot of my invention are adapted to be joined together, after the boot has been wrapped around the propeller shaft and universal joint housings, in a novel manner which facilitates the operation and provides a perfect seal. One end 14 of the boot has a cross piece 15, which may be of the same material as the body of the boot 6, stitched to the boot at 16 as shown in Figures 1 and 3. The cross piece 15 has a row of fastening devices in the form of upstanding flat metal prongs 17, which are fastened at their bottom edges in suitable holes formed in the piece 15 in any well known manner such, for example, as eyelets are clamped in shoes. The prongs 17 extend outwardly of the boot as shown in the drawing and are in alignment edge to edge, across the flap 15. A row of slits 18 are cut in the end 14 of the boot in alignment with the row of metal prongs 17 and are adapted to receive these prongs as the end 14 of the boot is folded over the reinforcing piece 15.

The opposite end 19 of the boot has a complementary and similarly arranged row of slits 20 adapted to be in alignment with the slits 18 of the end 14 and receive the prongs 17 when the boot is wrapped in place about the parts to be covered and the ends are brought together for fastening.

The ends of the boot are fastened together after they are wrapped around the parts to be covered by inserting the prongs 17 of the piece 15 through the slits 20 of the end 19 and then folding the end 14 of the boot over the end 19 and passing the prongs 17 through the slits 18 of this end. The end 19 will thus be sandwiched between the reinforcing piece 15 and the overlapping end 14 of the boot. The prongs 17 are then deformed by bending them over to tightly clamp the overlapping ends of the boot and reinforcing piece together as illustrated in Figure 4.

The above described overlapping and fastening arrangement of my invention has numerous advantages including the absolute sealing of the ends of the boot in overlapped relation to each other when folded and fastened in position to prevent leakage of grease or other lubricant and complete protection of the joint against dirt and other destructive elements. The reinforcing strip 15 greatly strengthens the joint and prevents undue wear.

The boot of my invention may be quickly assembled and disassembled and the fastening devices, being carried as they are by a separate strip other than the ends of the boot itself, are less likely to be torn out or accidentally destroyed in use.

Another feature of the boot of my invention lies in the provision of notches 21 in one side edge of each of the prongs 17. These notches 21 act to catch the edges of the slits 18 and 20 of the ends of the boot and retain the slit in engagement with the fastening device while the boot is being fastened in place. One slit is engaged at a time and will be temporarily held in engagement with the prong which is inserted in it by reason of the notch 21 while each succeeding slit and prong is engaged. This is a great advantage as the tendency of one prong to become unfastened from the engaging slit while the others are being hooked in place prior to the complete overlapping of both ends of the boot is thus overcome.

It will be noted that the notches 21 are all located in the side edge of the prong toward the larger end 7 of the boot, that is, the edge having the greatest diameter when wrapped about the universal housing so that the notches 21 will open toward the universal joint housing. The notches therefore act to catch the slits and prevent their disengagement when the large end of the boot is separated, which would be the tendency during assembly due to the larger diameter of the part 11 about which the larger edge of the joint is wrapped. The prongs 17 are also rounded at their top edges opposite the notches 21 to facilitate pulling of the overlying edges apart when it is necessary to remove the boot. The boot will thus be much easier to unfasten by pulling the overlapping sides apart from the small end of the boot 8 which surrounds the propeller shaft housing, then pulling in the opposite direction.

After the boot is wrapped about the joint and the ends fastened together in the manner above described, the ends of the boot will be securely fastened and sealed around the propeller shaft housing 11 and universal joint housing 12 by suitable band clamps 13 which are adapted to be wrapped around the outer surface of the ends of the boot and which have an elongated tongue 29 formed at one end of the clamp and a slot 30 at the other end in which the tongue 29 may be inserted and folded over to clamp the boot securely against the propeller shaft and universal joint housings respectively. I employ a clamping tool for this purpose which is made up of a lower part 22 and an upper part 23, the parts being joined together at their ends by suitable bolts 24 having wing nuts 25 threaded thereon as shown in the drawing. One end of the upper half 23 of the clamp is provided with an open slot 26 for receiving the bolt 24 so that the upper half of the clamp may be swung away from the lower half in gate fashion to facilitate passing the clamping device over the propeller shaft housing and universal joint housing during its use. The clamping device has a pair of annular shouldered openings adapted to fit around the band clamps 13, the shoulder of the opening 27 being of a size to properly press the clamp 13 about the propeller shaft housing and the shoulder in the opening 28 being of a larger diameter and adapted to compress the clamp 13 about the universal joint housing. The band clamps are placed around the ends of the boot over the universal joint and propeller shaft housing respectively, which generally are shouldered to facilitate this clamping and the two halves of the clamping device are drawn tightly together by turning the wing nuts down on the threaded bolts 24 when the band clamps 13 are tightly compressed about the boot and the housing to which it is being fastened. The tongues 29 of the clamp 13 are inserted through the slots 30 of this clamp and bent over to secure the clamp in position.

It will be noted that the boot of my invention is of double thickness at the points where the band clamps 13 are compressed about the boot greatly strengthening the boot and increasing its durability.

Formal changes may be made in the specific embodiment of the invention described without departing from the spirit and substance of the broad invention, the scope of which is commensurate with the appended claims.

I claim:

1. In a boot having reenforced side edges and a plurality of slits cut in each end of the boot, means to join the ends of the boot in sealed overlapped relationship with each other including a crosspiece fixed across one end of the boot by stitching spaced from the extreme end of the boot, to permit reception of the opposite end between the crosspiece and the end to which said crosspiece is fixed and fastening devices carried by the crosspiece adapted to engage the slits in the ends of the boot to secure the ends in overlapped relationship.

2. A boot having a body portion, the side edges of which are turned inwardly to form a reenforced edge and each end having a plurality of slits cut therein, a cross-flap fastened across one end of the boot and a plurality of deformable upstanding metal prongs carried by said cross-flap, each of said prongs having notches in one side edge adapted to engage the slits in the ends of the boot when the ends are being joined together.

3. A wrap-around boot for a universal joint comprising an elongated flat flexible member, means to join the ends of the boot in sealed overlapped relationship with each other, including a cross piece fixed across one end of the boot to permit reception of the opposite end between the cross piece and the end of the boot to which the cross piece is fixed, and fastening devices carried by the boot adapted to secure the ends in overlapping relationship.

4. A wrap-around boot for a universal joint and propeller shaft housing characterized in that the boot is provided with reinforced side edges and a plurality of slits cut in each end of the boot, means to join the ends of the boot in sealed overlapping relationship with each other, including a cross piece fixed across one end of the boot to permit reception of the opposite end between the cross piece and the end of the boot to which said cross piece is fixed, and fastening means carried by the boot adapted to secure the ends in overlapping relationship.

PANTALEON E. MIQUELON.